United States Patent [19]
Laas et al.

[11] Patent Number: 6,051,634
[45] Date of Patent: Apr. 18, 2000

[54] WATER-DISPERSIBLE OR WATER-SOLUBLE POLYURETHANES AS ADDITIVES FOR BUILDING MATERIALS

[75] Inventors: Hans-Josef Laas; Jan Mazanek, both of Köln; Dietbert Knöfel; Karl-Georg Böttger, both of Siegen; Anke Reinschmidt, Kreuztal, all of Germany

[73] Assignee: Bayer Aktiengesellschaft, Leverkusen, Germany

[21] Appl. No.: 09/151,848

[22] Filed: Sep. 11, 1998

[30] Foreign Application Priority Data

Sep. 15, 1997 [DE] Germany ............................ 197 40 454

[51] Int. Cl.⁷ .............................. C08J 3/00; C08K 3/20; C08L 75/00; C04B 7/00; C04B 12/04
[52] U.S. Cl. ............................ 524/4; 106/606; 106/713; 524/2; 524/589; 524/590
[58] Field of Search .................................. 524/2, 4, 589, 524/590; 106/606, 713

[56] References Cited

U.S. PATENT DOCUMENTS

| | | | |
|---|---|---|---|
| 3,965,051 | 6/1976 | Markusch et al. | 260/2.5 AK |
| 4,211,680 | 7/1980 | Shearing | 260/29.2 TN |
| 4,228,053 | 10/1980 | McLaughlin et al. | 260/29.2 TN |
| 4,413,112 | 11/1983 | Reiff et al. | 528/73 |
| 4,433,095 | 2/1984 | Hombach et al. | 524/563 |
| 4,446,256 | 5/1984 | Hicks | 523/402 |
| 4,472,550 | 9/1984 | Reiff et al. | 524/589 |
| 4,663,377 | 5/1987 | Hombach et al. | 524/196 |
| 4,870,151 | 9/1989 | Scholl et al. | 528/49 |
| 5,387,367 | 2/1995 | Haeberle et al. | 252/182.22 |
| 5,563,207 | 10/1996 | Brahm et al. | 524/591 |
| 5,731,396 | 3/1998 | Laas et al. | 528/49 |
| 5,744,542 | 4/1998 | Martz et al. | 524/590 |

FOREIGN PATENT DOCUMENTS

| | | |
|---|---|---|
| 2224956 | 6/1998 | Canada . |
| 13112 | 7/1980 | European Pat. Off. . |
| 23579 | 2/1981 | European Pat. Off. . |
| 181261 | 5/1986 | European Pat. Off. . |
| 1417618 | 12/1975 | United Kingdom . |
| 2626431 | 12/1977 | United Kingdom . |

OTHER PUBLICATIONS

Inorganic–Organic Polymers & Foams, Peter H. Markusch, Miltiadis I. Iliopulos, & Dieter Dieterich Reprinted from Advances in Urethane Science & Tech. vol. 8 (month unavailable) 1981–pp. 1–12.
H. Schron, Betone mit Knuststoffen, Ernst & Sohn Verlag, Berlin (month unavailable) 1991, p. 25.
Database WPI, Sec. Ch, An 96–482009 XP002087890.
Patent Abstracts of Japan, vol. 97, No. 1, Jan. 31, 1996 & JP 08 245250.
Databse WPI, Sec. Ch, AN 96–045229, X002087891.
Patant Abstracts of Japan, vol. 96, No. 3, Mar. 29, 1996 & JP 07 309653 A.
Database WPI, Sec. Ch, AN 96–439322, XP002087892.
Patent Abstracts of Japan, vol. 96, No. 12, Dec. 26, 1996 & JP 08 217516 A.

*Primary Examiner*—Patrick D. Niland
*Attorney, Agent, or Firm*—Joseph C. Gil; Diderico van Eyl

[57] ABSTRACT

Use of water-dispersible or water-soluble polyether-urethanes, which optionally contain isocyanate groups, as additives for inorganic binders in the preparation of a building material, particularly a high-density or high-strength mortar or concrete composition. The building material resulting from the use of the water-dispersible or water-soluble polyether-urethanes.

4 Claims, No Drawings

WATER-DISPERSIBLE OR WATER-SOLUBLE POLYURETHANES AS ADDITIVES FOR BUILDING MATERIALS

FIELD OF THE INVENTION

The invention relates to the use of water-dispersible or water-soluble polyether-urethanes in the preparation of a mineral building material, particularly a high-density or high-strength mortar or concrete composition.

BACKGROUND OF THE INVENTION

Known building materials made from inorganic binders include concrete and mortar. Conventional concrete or mortar compositions are made from mixtures containing an inorganic binder, e.g., cement, an aggregate such as gravel or sand, water and, optionally, additives and/or admixes. The terms "concrete" and "mortar" herein refer to compositions that differ only by the maximum particle size of the aggregates used to make a composition. The term "mortar" refers to compositions made from aggregates having a maximum particle size of up to 4 mm. The term "concrete" refers to compositions made from coarser aggregates. In the present invention, no further distinction is made between the terms "concrete" and "mortar."

To improve the processing and useful properties of concrete and mortar compositions, e.g., an increase in the composition's strength or resistance to chemicals, plastics have been increasingly employed as concrete additives. An overview of the large number of different polymers which have been tested for modifying concrete is disclosed in H. Schorn, "Betone mit Kunststoffen" [Concretes with Plastics], Ernst & Sohn Verlag für Architektur und technische Wissenschaften, Berlin 1991, p. 25.

Polyisocyanates and polyurethanes have also been proposed as possible additives for mixtures used to prepare concrete or mortar compositions. DE-A 1,924,468, for instance, mentions aromatic polyisocyanates such as diphenylmethane diisocyanate (MDI), toluene diisocyanate (TDI) or derivatives thereof. The patent also discloses biurets and urethanes of aliphatic hexamethylene diisocyanates (HDI) as suitable additives for cement mixtures. When added to a concrete composition, either individually or in combination with additional polymers that are reactive with isocyanate groups, in the manufacture of floor coverings, these additives are said to accelerate the hardening of the cement mixtures, thereby enabling the floor to be walked on earlier than it would ordinarily be walked on. The faster hardening of concrete compositions or mortar compositions after addition of small amounts of organic (preferably aromatic) polyisocyanates is also known from EP-A 23,579. In both of these references the hydrophobic polyisocyanates are completely incompatible with water and cannot be stirred homogeneously into an inorganic binder, even if a considerable amount of an organic solvent is used.

However, in order to form a uniform polymer skeleton within the inorganic binder matrix (thereby resulting in a concrete or mortar composition having optimum final properties), the polymeric additive should be distributed in the binder mixture as uniformly as possible.

EP-A 181,261 describes the use of polyisocyanates in the form of finely divided aqueous dispersions for endogenous carbonatization of concrete. Hydrophobic MDI is exclusively employed here as the polyisocyanate, and it is premixed with water at an MDI:water ratio of 4:1 to 2:1 with the aid of a high-speed stirrer, i.e., it is added to the concrete composition in the form of a water-in-oil emulsion. Although such emulsions of water in MDI which are obtainable using high shear forces have in themselves a limited stability, when these emulsions are stirred into an excess amount of an aqueous system, as a concrete mixture is, no finely divided oil-in-water emulsions are obtained. Instead, instant phase separation occurs. Polyisocyanates also cannot be incorporated sufficiently homogeneously into concrete compositions or mortar compositions by the process of EP-A181,261.

According to the teachings of DE-A 2,300,206, the compatibility of hydrophobic polyisocyanates with cement compositions can be improved significantly when they are used in combination with water-soluble polymers such as cellulose derivatives, polyvinyl alcohols or polyether-alcohols (which optionally also contain additional emulsifiers.) However, even if organic solvents are used, the aqueous cement mixtures obtainable by the process described have only very short processing times of a few minutes, times which are not useful in practice. Furthermore, the considerable amount of water-soluble polymers incorporated into the binder in this manner lead to a permanent hydrophilicity and therefore lead to a concrete having undesirably high water absoption.

U.S. Pat. No. 4,143,014 describes another very specific process for incorporating a hydrophobic polyisocyanate into an aqueous system. According to this process, mixtures of water-soluble polyether-diols with excess equivalent amounts of MDI are stirred in water within a short period of time after the start but still before the end of the urethanization reaction to give clear stable solutions. According to U.S. Pat. No. 4,228,053, such solutions can be suitable for improving the stability properties of concrete. The precise point in time at which the reaction mixtures of MDI and polyether-alcohol have an adequate water-miscibility that lasts for a few minutes depends on the nature of the particular polyether-diol employed and can be determined only in involved, complicated, time-consuming preliminary experiments. This process therefore also has not found acceptance in practice.

All the processes mentioned above require either the use of additional organic compounds such as solvents, specific water-soluble polymers, or specific mixing units, i.e., high-speed stirrers in order to render the hydrophobic polyisocyanate component mixable with the inorganic binder even to a minor degree.

To overcome these disadvantages, attempts have also been made to employ, self-dispersible polyisocyanates which have been modified hydrophilically by incorporation of ionic groups (DE-A 2,359,611) as additives to inorganic binders. Although such polyisocyanates containing salt groups can be stirred into aqueous systems in very finely divided form without high shear forces, they have a completely inadequate storage stability in bulk. Because of the known catalytic activity of ionic groups, polymerization of the isocyanate groups occurs at room temperature, e.g., by the trimerization to polyisocyanurates or the formation of nylon structures. Such polymerization generally leads to gelling of the product after a few days.

It is an object of the invention to develop a new method for improving the processing and properties of concrete or mortar compositions without the disadvantages described in the prior art. It would be desired that the additives used in the method be storage-stable and free from organic solvents. It would further be desired that the additives be readily dispersible, in finely divided form, without the use of high-speed stirrers, and that the additives do not adversely influence the processing time of concrete compositions.

It has now been possible to achieve these objects by the use of specific polyether-urethanes as additives for inorganic binders in mixtures to make mortar or concrete compositions. Suitable polyether-urethane compositions are known per se and are described as surface-active agents or emulsifiers for hydrophobic polymers (poly-isocyanates in a number of publications, e.g., DE-A 2,415,435, EP-A 13,112, EP-A 19,844, EP-A 61,628, EP-A 110,497, EP-A 206,059, EP-A 281,801, EP-A 486,881, WO 96/30425).

The invention is based on the surprising observation that the addition of very small amounts of the water-dispersible or water-soluble polyether-urethanes to hydraulic binders in the preparation of mortar or concrete compositions considerably improves the mechanical properties of the concrete or mortar compositions. These properties include the compressive strength, the tensile strength, and the elasticity of the mortar or concrete composition. The polyether-urethanes can optionally contain free isocyanate groups.

SUMMARY OF THE INVENTION

The present invention relates to a method for making a mineral building material from an inorganic binder containing the steps of:

(i) homogeneously mixing a water-dispersible or water-soluble polyether-urethane composition with an aggregate, a hydraulic inorganic binder, and water, the polyether-urethane composition comprising:

a) an average isocyanate functionality of less than 1.8, a content of aliphatically and/or cycloaliphatically bonded isocyanate groups (calculated as NCO; molecular weight=42) from 0 to 10 wt. %, b) 2.0 to 25.0 wt. % content of urethane groups (calculated as NHCOO; molecular weight=59), c) 30 to 90 wt. % content of ethylene oxide units (calculated as $C_2H_4O$; molecular weight=44) bonded within polyether chains containing an average of 5 to 50 ethylene oxide units;

(ii) hardening the mixture of step (i) to form the mineral building material.

The method enhances useful properties of the building material (preferably a concrete or a mortar composition) as compared to building materials made from methods which do not use the polyether-urethane compositions. The invention is also directed to the mixture used to make the building material as well as the building material that results when the mixture is hardened.

The present invention also relates to the use of water-dispersible or water-soluble polyether-urethanes as additives with hydraulic binders in the preparation of mortar or concrete compositions. The polyether-urethanes have:

a) an average isocyanate functionality of less than 1.8, a content of aliphatically and/or cycloaliphatically bonded isocyanate groups (calculated as NCO; molecular weight=42) from 0 to 10 wt. %, b) 2.0 to 25.0 wt. % content of urethane groups (calculated as NHCOO; molecular weight=59), c) 30 to 90 wt. % content of ethylene oxide units (calculated as $C_2H_4O$; molecular weight=44) bonded within polyether chains containing an average of 5 to 50 ethylene oxide units

DETAILED DESCRIPTION OF THE INVENTION

The concrete or mortar additives employed according to the invention are water-dispersible or water-soluble polyether-urethanes which optionally contain free isocyanate groups and are known per se.

Suitable polyether-urethanes compositions that can be used in the method of the present invention can be prepared from the starting compounds "A)", "B)", and "C)" described below. Starting compounds A) for the preparation of such polyether-urethanes are any desired mono- or diisocyanates having a molecular weight of 85 to 400 which have aliphatically, cycloaliphatically and/or aromatically bonded isocyanate groups and are accessible by phosgenation or by phosgene-free processes, i.e., by urethane cleavage. Examples include propyl isocyanate, butyl isocyanate, cyclohexyl isocyanate, stearyl isocyanate, phenyl isocyanate, 1,4-butane diisocyanate, 1,6-diisocyanatohexane (hexamethylene diisocyanate, HDI), 1,5-diisocyanato-2,2-dimethylpentane, 2,2,4- and 2,4,4-trimethyl-1,6-diisocyanato-hexane, 1,10-diisocyanatodecane, 1,3- and 1,4-diisocyanatocyclohexane, 1-isocyanato-3,3,5-trimethyl-5-isocyanato-methylcyclohexane (isophorone diisocyanate, IPDI), 4,4'-diisocyanatodicyclohexylmethane, 1,3-diisocyanato-2(4)-methylcyclohexane, 1,3- and 1,4-phenylene diisocyanate, 2,4- and 2,6-toluylene diisocyanate (TDI), diphenylmethane 2,4'- and 4,4'-diisocyanate (MDI) and naphthylene 1,5-diisocyanate or mixtures thereof. Also suitable are polyisocyanates containing uretdione, isocyanurate, urethane, allophanate, biuret, iminooxadiazinedione and/or oxadiazinetrione groups which can be prepared by modification of the preceding mono- or diisocyanates and are described by way of Example in DE-A 1,670,666, 3,700,209 and 3,900,053 or EP-A 336,205 and 339,396.

Preferred starting compounds A) include those compounds having aliphatically and/or cycloaliphatically bonded isocyanate groups. HDI, IPDI, 4,4'-diisocyanato-dicyclohexylmethane or mixtures thereof and polyisocyanates based on these diisocyanates are particularly preferred.

Suitable hydroxyl polyethers B) for the preparation of the water-dispersible or water-soluble polyether-urethanes are mono- or polyfunctional polyalkylene oxide polyether-alcohols containing an average of 5 to 50 ethylene oxide units per molecule, and are accessible in a manner known per se by alkoxylation of suitable starter molecules (See Ullmanns Encyclopädie der technischen Chemie [Ullmann's Encyclopaedia of Industrial Chemistry], 4th Edition, Volume 19, Verlag Chemie, Weinheim p. 31–38). Such starter molecules can be, for example, any desired mono- or polyfunctional alcohols of the molecular weight range 32 to 300, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, hydroxymethylcyclohexane, 3-methyl-3-hydroxymethyloxetane, benzyl alcohol, phenol, the isomeric cresols, octylphenols, nonylphenols and naphthols, furfuryl alcohol, tetrahydrofurfuryl alcohol, 1,2-ethanediol, 1,2- and 1,3-propanediol, the isomeric butanediols, pentanediols, hexanediols, heptanediols and octanediols, 1,2- and 1,4-cyclohexanediol, 1,4-cyclohexanedimethanol, 4,4-(1-methylethylidene)-biscyclohexanol, 1,2,3-propanetriol, 1,1,1-trimethylolethane, 1,2,6-hexanetriol, 1,1,1-trimethylolpropane, 2,2-bis-(hydroxymethyl)-1,3-propanediol or 1,3,5-tris(2-hydroxyethyl) isocyanurate.

Alkylene oxides which are suitable for the alkoxylation reaction include, in particular, ethylene oxide and propylene oxide. Such compounds can be employed in the alkoxylation reaction in any desired sequence or also as a mixture.

Suitable polyether-alcohols B) are either pure polyethylene oxide polyether-alcohols or mixed polyalkylene oxide polyethers, the alkylene oxide units of which contain at least 70 mol-%, preferably of at least 80 mol-% of ethylene oxide units.

Preferred polyalkylene oxide polyether-alcohols are those which have been prepared using the above-mentioned monoalcohols having a molecular weight of 32 to 150 as starter molecules. Particularly preferred polyether-alcohols B) are pure polyethylene glycol monomethyl ether-alcohols which contain an average of 5 to 50, particularly preferably 5 to 25, ethylene oxide units.

In addition to the polyether-alcohols mentioned, optionally compounds C) (which also contain groups which are reactive with isocyanate groups) can be used in the preparation of the water-dispersible or water-soluble polyether-urethanes employed according to the invention as concrete additives. These compounds are chiefly mono- or polyfunctional organic compounds having a molecular weight of 32 to 500 and containing hydroxyl, amino and/or mercaptan groups, or any desired mixtures of such compounds.

Suitable components C) include components such as the simple alcohols described above as starting molecules for the preparation of the polyether-alcohols B). Suitable alcohols include ether-alcohols such as 2-methoxyethanol, 2-ethoxyethanol, 2-propoxyethanol, 2-butoxyethanol, diethylene glycol, diethylene glycol monomethyl ether, diethylene glycol monoethyl ethers, diethylene glycol monobutyl ether, triethylene glycol, tetraethylene glycol, 1-methoxy-2-propanol, 1-ethoxy-2-propanol, dipropylene glycol monomethyl ether, tripropylene glycol monomethyl ether, the isomeric dipropylene glycols, 3-methoxy-1-butanol and glycerol 1,3-diethyl ether. Ester-alcohols, such ethyl glycolate, butyl glycolate, ethyl lactate and neopentyl glycol hydroxypivalate, are also suitable.

Suitable compounds are also any desired mono- or polyfunctional amines, e.g., methylamine, ethylamine, n-propylamine, isopropylamine, the isomeric butylamines, pentylamines, hexylamines and octylamines, n-dodecylamine, n-tetradecylamine, n-hexadecylamine, n-octadecylamine, cyclohexylamine, the isomeric methylcyclohexylamines, aminomethyl-cyclohexane, dimethylamine, diethylamine, dipropylamine, diisopropylamine, dibutylamine, diisobutylamine, bis-(2-ethylhexyl) amine, N-methyl- and N-ethylcyclohexylamine, dicyclohexylamine, hydrazine, ethylenediamine, 1,2-diaminopropane, 1,4-diaminobutane, 2-methylpentamethylenediamine, 1,6-diaminohexane, 2,2, 4- and 2,4,4-trimethylhexamethylene-diamine, 1,2-diaminocyclohexane, 1-amino-3,3,5-trimethyl-5-aminomethylcyclohexane(isophoronediamine, IPDA), 4,4'-diaminodicyclohexyl-methane, pyrrolidine, piperidine, piperazine, (3-aminopropyl)trimethoxy-silane, (3-aminopropyl)triethoxysilane and (3-methylamino)propyltri-methoxysilane, amino-alcohols such as 2-aminoethanol, 2-methylamino-ethanol, 2-(dimethylamino)ethanol, 2-(diethylamino)ethanol, 2-(dibutyl-amino)ethanol, diethanolamine, N-methyldiethanolamine, triethanolamine, 3-amino-1-propanol, 3-dimethylamino-1-propanol, 1-amino-2-propanol, 1-dimethylamino-2-propanol, 1-diethylamino-2-propanol, bis-(2-hydroxypropyl)amine, bis-(2-hydroxypropyl) methylamine, 2-(hydroxyethyl)-bis-(2-hydroxypropyl) amine, tris-(2-hydroxypropyl)amine, 4-amino-2-butanol, 2-amino-2-methylpropanol, 2-amino-2-methyl- 1,3-propanediol, 2-amino-2-hydroxypropyl-1,3-propanediol and N-(2-hydroxyethyl)piperidine, ether-amines, such as 2-methoxyethylamine, 3-methoxypropylamine, 2-(2-dimethylaminoethoxy)ethanol and 1,4-bis-(3-aminopropoxy) butane, or mercaptans, e.g., butylmercaptan and dodecylmercaptan.

In addition, oximes such as acetone oxime, butanone oxime and cyclohexanone oxime, lactams, such as ϵ-caprolactam, or C—H-acid compounds, e.g., diethyl malonate, which are (known blocking agents for isocyanate groups from polyurethane chemistry) can optionally also be employed as component C). Particularly suitable starting compounds C) are the above-mentioned compounds of molecular weight range 32 to 300 containing hydroxyl groups and/or secondary amino groups.

The water-dispersible or water-soluble polyether-urethanes used in the method of the invention can be prepared by known processes. Suitable polyether-urethanes are described as surface-active agents or emulsifiers for hydrophobic polymers, such as polyisocyanates, in a number of publications (e.g., DE-A 2,415, 435, EP-A 13,112, EP-A 19,844, EP-A 61,628, EP-A 110,497, EP-A 206,059, EP-A 281,801, EP-A 486,881, WO 96/30425).

Generally, the procedure used to prepare the water-dispersible or water-soluble polyether-urethanes includes reacting the starting compounds A), B) and, optionally, C) with one another, optionally under an inert gas such as nitrogen, at temperatures from 20 to 140° C., preferably from 40 to 120° C., at an equivalent ratio of NCO groups to groups which are reactive with isocyanates of 0.5:1 to 3:1, preferably 0.8:1 to 2:1, preferably until the theoretically calculated NCO content is reached. The reaction is generally carried out without a solvent. However, it can also be carried out in suitable solvents which are inert towards isocyanate groups. Particularly suitable solvents include solvents such as ethyl acetate, butyl acetate, ethylene glycol monomethyl- or ethyl ether-acetate, 1-methoxypropyl-2-acetate, 2-butanone, 4-methyl-2-pentanone, cyclo-hexanone, toluene or mixtures thereof. Suitable solvents include propylene glycol diacetate, diethylene glycol dimethyl ether, diethylene glycol ethyl and butyl ether-acetate, N-methylpyrrolidonc and N-methylcaprolactam, or mixtures of such solvents.

If mono- or diisocyanates are employed as starting components A), the reaction with the starting compounds B) and, optionally, C) can also be carried out at an equivalent ratio of NCO groups to groups which are reactive with isocyanates of greater than 3:1, e.g., up to a ratio of 50:1. In this case, the excess unreacted mono- or diisocyanates are separated off after the theoretically calculated NCO content has been reached, for example by thin film distillation or extraction down to a residual content of less than 2 wt. %, preferably less than 0.5 wt. %.

The water-dispersible or water-soluble polyether-urethanes used in the invention optionally contain free aliphatically and/or cycloaliphatically bonded isocyanate groups. Polyether-urethanes which additionally contain aromatically bonded isocyanate groups, preferably in less than the molar amount, based on the total amount of free isocyanate groups, are also suitable according to the invention as concrete additives as long as they comply with the conditions mentioned above under a) to c). Such mixed aliphatic/aromatic polyether-urethanes are likewise already known and can be obtained, for example, by the process described in EP-A 680,983 by reaction of polyethylene oxide polyethers and, optionally, alcohols with mixtures of low-monomer polyisocyanates based on HDI and those based on 2,4(6)-diisocyanatotoluene (toluene diisocyanate, TDI).

Regardless which preparation process is chosen, the water-dispersible or water-soluble polyether-urethanes have an average isocyanate functionality of less than 1.8, preferably less than 1.5, a content of aliphatically and/or cycloaliphatically bonded isocyanate groups of 0 to 10 wt. %, preferably 0 to 6 wt. %, a content of urethane groups of 2.0 to 25.0 wt. %, preferably 4.0 to 21.5 wt. %, and a content of ethylene oxide units bonded within polyether chains of 30 to 90 wt. %, preferably 40 to 80 wt. %, in which the polyether chains contain an average of 5 to 50, preferably 5 to 25 ethylene oxide units.

Preferred concrete or mortar additives include water-dispersible or water-soluble polyether-urethanes which have been prepared by reaction of polyisocyanates which are based on aliphatic and/or cycloaliphatic diisocyanates, contain isocyantirate groups and have an isocyanate group content of 12 to 28 wt. % and a content of monomeric diisocyanates of less than 0.5 wt. % with polyether-alcohols containing an average of 5 to 50 ethylene oxide units, and optionally, compounds of the molecular weight range 32 to 300 which carry groups which are reactive with isocyanate groups.

Particularly preferred compounds are those which have been prepared by reaction of a polyisocyanate based on HDI, contain substantially isocyanurate groups and optionally uretdione groups and/or allophanate groups and have an isocyanate group content of 19 to 24 wt. % and a content of monomeric HDI of less than 0.5 wt. % with polyethylene glycol monomethyl ethers containing an average of 5 to 25 ethylene oxide units, and optionally, compounds of the molecular weight range 32 to 300 which carry groups which are reactive with isocyanate groups.

According to the invention, the water-dispersible or water-soluble polyether-urethanes which optionally contain free isocyanate groups can be added to any desired concrete compositions or mortar compositions to improve the processing and use properties.

Preparation of concrete or mortar compositions from inorganic binders, aggregates, water and, optionally, additives and admixes is well known and is described in detail in Ullmanns Encyclopädie der technischen Chemie [Ullmann's Encyclopaedia of Industrial Chemistry], 4th Edition, Volume 8, Verlag Chemie, Weinheim, p. 314–326.

Inorganic binders are conventionally referred to mineral substances which harden like stone when mixed with water through physical and/or chemical processes. Examples of suitable inorganic binders include Portland cement, Portland slag cement, Portland fly ash cement, Portland limestone cement, Portland fly ash slag cement and blast furnace cement, and special cements, e.g., cements of high sulfate resistance, low heat of hydration or low alkali content, or also synthetic anhydrite, gypsum or quicklime.

The usual aggregates are, in particular, naturally occurring or synthetic, dense or porous rocks such as sand, gravel, macadam, stone chips, crushed-stone sand, lava slag, crushed clinker, granite, basalt, pumice, clay, clay slate, fly ash or exfoliated mica. In some cases, aggregates include metals or organic aggregates. Optionally, additives and admixes which can help to influence the properties of the fresh or set concrete or mortar in a controlled manner can be employed in the preparation of concrete.

The phrase "concrete additives" refers to those substances which are generally added to mixtures used to make concrete or mortar compositions in an amount of not more than 5 wt. % and consequently play no role as a volume content. These additives include but are not limited to concrete liquefiers, air pore-forming agents, concrete sealants, solidification retardants or accelerators and squeezing aids for pre-stressed concrete.

So-called concrete admixes are added to mixtures used to make concrete in a very much larger amount than the additives mentioned. These are, in particular, mineral substances such as rock powders, fly ash, blast furnace slags or trass, and also plastics or pigments or cement dyes.

The water-dispersible or water-soluble polyether-urethanes which optionally contain free isocyanate groups are added according to the invention to a mixture used to make a mortar composition or a concrete composition in an amount of up to 10 wt. %, preferably 0.5 to 5 wt. %, based on the binder content. The addition here can be made at any desired point in time before or during the mixing operation, both in bulk and in the form of aqueous dispersions of the polyether-urethanes in the mixing water or a portion of the mixing water.

In general, the new use of these additives is done so in solvent-free form. However, if necessary, the addition of the additives can also be made in the form of solutions in suitable solvents which are inert, optionally, to isocyanate groups, for example those described above for the preparation of the polyether-urethanes.

The water-dispersible or water-soluble polyether-urethanes can also be stirred in very finely divided form and completely homogeneously into concrete compositions or mortar compositions without specific mixing units, e.g., high-speed stirrers. Even the addition of only small amounts already leads to a considerable improvement in the processing and use properties of the binder mixture. As a result of a highly liquefying effect on the fresh mortar mixture, the water/cement value (W/C value) of mortars modified according to the invention are significantly lower than that of comparable non-modified samples. Because of the lower mixing water requirement, the hardened polyurethane-modified mortars have a higher density, which manifests itself, inter alia, in considerably improved mechanical properties. These improvements include improvements such as an increase in compressive and flexural tensile strength, improved resistance to alternating freezing/thawing and resistance to chemical attacks. For instance, the compressive or flexural tensile strength of a mortar or concrete composition can be increased more than 20%. The processing time of the concrete compositions or mortar compositions was not restricted by the co-use of these specific polyether-urethanes.

Concrete or mortar compositions prepared according to the invention with the addition of water-dispersible or water-soluble polyether-urethanes which optionally contain free isocyanate groups can in principle be employed in all fields of construction in which conventional building materials are used. They are particularly suitable for those applications where high standards concerning the mechanical strength and chemical resistance are required, e.g., in above-ground and underground construction, floor coverings, road construction or for industrial areas.

The invention is further illustrated but is not intended to be limited by the following examples in which all parts and percentages are by weight unless otherwise specified.

Reference made to average molecular weight refers to an average molecular weight based on weight.

EXAMPLES

Preparation of the Starting Compounds
Water-dispersible polyether-urethane Z1)

55 parts of a monofunctional polyethylene oxide polyether made from methanol and having an average molecular weight of 350 were added at room temperature, while stirring, to 45 parts of a polyisocyanate. The polyisocyanate was based on HDI, contained isocyanurate groups, had an NCO content of 21.5%, an average NCO functionality of approx. 3.8, a viscosity at 23° C. of 3,000 mPa·s and a content of monomeric HDI of 0.1%. The mixture was then heated at 100° C. for 2.5 h. After cooling to room temperature, a practically colorless, clear polyether-urethane with the following characteristics was present:

| | |
|---|---|
| NCO content: | 3.1% |
| Monomeric HDI: | 0.07% |
| NCO functionality (calc.): | approx. 1.2 |
| Content of urethane groups (calc.): | 9.3% |
| Content of ethylene oxide units (calc): | 50.0% |
| Viscosity (23° C.): | 3,270 mPa · s |

Water-dispersible polyether-urethane Z2)

60 parts of a monofunctional polyethylene oxide polyether made from methanol and having an average molecular weight of 500 were added at room temperature, while stirring, to 40 parts of a polyisocyanate based on HDI. The polyisocyanate contained isocyanurate groups, had an NCO content of 23.1%, an average NCO functionality of approx. 3.3, a viscosity at 23° C. of 1,200 mPa·s and a content of monomeric HDI of 0.1%. The mixture was then heated at 100° C. for 3 h. After cooling to room temperature, a practically colorless, clear polyether-urethane with the following characteristics was present:

| | |
|---|---|
| NCO content: | 3.3% |
| Monomeric HDI: | 0.05% |
| NCO functionality (calc.): | approx. 1.2 |
| Content of urethane groups (calc.): | 7.1% |
| Content of ethylene oxide units (calc): | 56.2% |
| Viscosity (23° C.): | 1,340 mPa · s |

Water-dispersible polyether-urethane Z3)

64.2 parts of a monofunctional polyethylene oxide polyether made from methanol and having an average molecular weight of 350 were added at room temperature, while stirring, to 35.8 parts of a polyisocyanate. The polyisocyanate was based on HDI, contained isocyanurate groups, had an NCO content of 21.5%, an average NCO functionality of approx. 3.8, a viscosity at 23° C. of 3,000 mPa·s and a content of monomeric HDI of 0.1%. The mixture was then heated at 100° C. for 4 h. After cooling to room temperature, a colorless, clear polyurethane in which free isocyanate groups can no longer be detected by IR spectroscopy is present. The product has the following characteristics:

| | |
|---|---|
| Content of urethane groups (calc.): | 10.8% |
| Content of ethylene oxide units (calc.): | 58.3% |
| Viscosity (23° C.): | 3,650 mPa · s |

Water-dispersible polyether-urethane Z4)

41.4 parts of a monofunctional polyethylene oxide polyether made from methanol and having an average molecular weight of 500 and 8.1 parts ethanol were added at room temperature, while stirring, to 50.5 parts of a polyisocyanate. The polyisocyanate was based on HDI, contained isocyanurate groups, had an NCO content of 21.5%, an average NCO functionality of approx. 3.8, a viscosity at 23° C. of 3,000 mPa·s and a content of monomeric HDI of 0.1%. The mixture was then heated at 100° C. for 3 h. After cooling to room temperature, a colorless, clear polyether-urethane in which free isocyanate groups could no longer be detected by IR spectroscopy is present. The product has the following characteristics:

| | |
|---|---|
| Content of urethane groups (calc.): | 15.3% |
| Content of ethylene oxide units (calc.): | 38.8% |
| Viscosity (23° C.): | 4,100 mPa · s |

Water-dispersible polyether-urethane Z5)

37 parts of a monofunctional polyethylene oxide polyether made from methanol and having an average molecular weight of 500 were added at a temperature of 80° C., while stirring, to 63 parts HDI. The mixture was stirred for 3 h, until an NCO content of 28.2% was reached. The unreacted monomeric HDI was then separated off by thin film distillation at a temperature of 130° C. under a pressure of 0.1 mbar. An almost colorless, clear polyether-urethane with the following characteristics was obtained:

| | |
|---|---|
| NCO content: | 6.0% |
| Monomeric HDI: | 0.2% |
| NCO functionality (calc.): | approx. 1.0 |
| Content of urethane groups (calc.): | 9.4% |
| Content of ethylene oxide units (calc.): | 74.5% |
| Viscosity (23° C.): | 360 mPa · s |

Water-dispersible polyether-urethane Z6)

1.4 parts n-butanol were added at a temperature of 50° C. to a mixture of 40 parts of a polyisocyanate mixture. The polyisocyanate mixture consisted of a polyisocyanate based on HDI, containing uretdione groups and isocyanurate groups, having an NCO content of 21.8%, an average NCO functionality of approx. 2.5, a viscosity at 23° C. of 170 mPa·s and a content of monomeric HDI of 0.2%, and 8.6 parts 2.4-diisocyanatotoluene (TDI). The reaction mixture was then stirred until the NCO content was 23.9%. The mixture was allowed to cool to 40° C., 0.05 part of a trimerization catalyst (Mannich base based on phenol/dimethylamine, 40% in butyl acetate) was added and the mixture was kept at this temperature for an additional 72 hours, until the NCO content was 19.6%. The trimerization was stopped by addition of 0.04 part methyl p-toluenesulfonate, 50 parts of a monofunctional polyethylene oxide polyether made from methanol and having an average molecular weight of 500 to the resulting polyisocyanate mixture, and the mixture was subsequently stirred at 50° C. until an NCO content of 5.7 was reached. After cooling to room temperature, a practically colorless, clear polyether-urethane with the following characteristics was present:

| | |
|---|---|
| NCO content: | 5.7% |
| Content of aliphatically bonded NCO (calc.): | min. 3.7% |

-continued

| | |
|---|---|
| Content of aromatically bonded NCO (calc.): | not more than 2.0% |
| Monomeric TDI: | 0.09% |
| Monomeric HDI: | <0.03% |
| NCO functionality (calc.): | approx. 1.6 |
| Content of urethane groups (calc.): | 7.1% |
| Content of ethylene oxide units (calc.): | 46.8% |
| Viscosity (23° C.): | 5,400 mPa · s |

Preparation of polyether-urethane emulsions 100 parts water were added to in each case 10 parts polyether-urethanes Z1) to Z6) in a stirred beaker and the mixture was stirred manually for 2 min. In the case of polyether-urethanes Z4) and Z6), very finely divided, bluewash-tinged emulsions were formed, and in the case of polyether-urethanes Z1), Z2), Z3) and Z5), practically clear solutions formed. After a standing time of 180 min. at 23° C., all the emulsions and solutions were still stable; in no case were precipitates or sediment to be observed.

EXAMPLES 1–6

Preparation of Mortar Compositions Modified With the Polyether-urethane Compositions Samples of fresh mortar and set mortar were prepared from commercially available Portland cement DIN 1164—CEM I 42.5 R (the binder) and CEN standard sand (DIN EN 196) (the aggregate), in accordance with DIN EN 196 part 1. For this, the binder and mixing water were introduced into the mixing trough and premixed for 30 s at a low stirring speed (stage 1). The aggregate was then added at the same stirring speed in the course of 30 s, and the components were then mixed at a high stirring speed (stage 2) for a further 30 s. After a resting pause of 90 s, the mortar was stirred at stage 2 for a further 60 s. The water-dispersible or water-soluble polyurethanes Z1) to Z6) employed as additives were in each case added to the mixing water in an amount of 2%, based on the binder content of the mixture, and were dispersed with the aid of a rod mixer at 12,000 rpm for 20 s. The mortars were standardized to a slump of 170±5 mm by varying the amount of water added.

The water/cement value (W/C value), the air pore content and the bulk density of each of the fresh mortar compositions thus obtained were determined. The values found are listed in table 1. A non-modified mortar prepared analogously serves as a comparison.

TABLE 1

W/C value, air pore content and fresh mortar bulk density

| Example | Additive | W/C value | Air pore content [vol. %] | Fresh mortar bulk density [kg/dm³] |
|---|---|---|---|---|
| Comparison | — | 0.47 | 5.3 | 2.25 |
| 1 | Z1) | 0.32 | 5.2 | 2.33 |
| 2 | Z2) | 0.37 | 7.2 | 2.27 |
| 3 | Z3) | 0.34 | 5.6 | 2.41 |
| 4 | Z4) | 0.34 | 5.2 | 2.31 |
| 5 | Z5) | 0.32 | 5.9 | 2.30 |
| 6 | Z6) | 0.34 | 5.7 | 2.42 |

Comparison of the W/C values shows the liquefying effect of the water-dispersible or water-soluble polyether-urethanes on the fresh mortar mixtures.

To characterize the set mortar properties, the flexural tensile and compressive strength and the dynamic modulus of elasticity (E modulus) of the polyurethane-modified mortars were determined after a hydration time of 7 and 28 days. Prisms of 40×40×160 mm were produced in accordance with DIN EN 196, part 1 as test specimens. The test specimens were released from the mould after their hardening 1 to 2 days after their production, depending on the nature of the polyether-urethane added. The standard prisms were then subjected to humid storage, i.e., stored under water at 20° C. up to the 7th day after the production and then in a climate at 23° C./50% rel. atmospheric humidity (DIN 50014) until the time of testing.

Table 2 shows the set mortar properties of the modified mortars, again in comparison with a corresponding non-modified sample. All the mortars prepared according to the invention (Examples 1 to 6) show significantly higher strengths compared with the non-modified specimen. The values found were sometimes considerably above those of the comparison specimen.

TABLE 2

Flexural tensile and compressive strength and dynamic E modulus after a hydration time of 7 and 28 days

| Example | Additive | Removable after [d] | Flexural tensile strength [N/mm²][a] | | Compressive strength [N/mm²][a] | | Dynamic E modulus N/mm²[a] | |
|---|---|---|---|---|---|---|---|---|
| | | | 7 d | 28 d | 7 d | 28 d | 7 d | 28 d |
| Comparison | — | 1 | 7.60 (100%) | 9.55 (100%) | 48.6 (100%) | 61.5 (100%) | 40150 (100%) | 37700 (100%) |
| 1 | Z1) | 1 | 11.43 (150%) | 10.28 (113%) | 80.5 (166%) | 101.0 (164%) | 54150 (135%) | 52450 (139%) |
| 2 | Z2) | 1 | 8.82 (116%) | 10.77 (113%) | 68.2 (140%) | 87.4 (142%) | 48450 (121%) | 48750 (129%) |
| 3 | Z3) | 1 | 10.18 (134%) | 10.98 (115%) | 77.4 (159%) | 93.3 (152%) | 52450 (131%) | 53700 (142%) |
| 4 | Z4) | 1 | 10.11 (133%) | 10.42 (109%) | 75.0 (154%) | 90.7 (147%) | 50700 (126%) | 51400 (136%) |
| 5 | Z5) | 2 | 10.14 (133%) | 9.88 (103%) | 79.7 (164%) | 100.3 (163%) | 53050 (132%) | 53600 (142%) |
| 6 | Z6) | 2 | 9.75 (128%) | 10.28 (108%) | 78.1 (161%) | 93.2 (152%) | 53400 (133%) | 52550 (139%) |

[a] Percentage data in each case relate to the values of the comparison mortar

Athough the invention has been described in detail in the foregoing for the purpose of ilustration, it is to be understood that such detail is solely for that purpose and that variations can be made therein by those skilled in the art without departing from the spirit and scope of the invention.

What is claimed is:

1. A method for making a mineral building material comprising the steps of:

(i) homogeneously mixing a water-dispersible or water-soluble polyether-urethane composition with an aggregate, a hydraulic inorganic binder, and water, the polyether-urethane composition comprising:
      a) an average isocyanate functionality of less than 1.8, a content of aliphatically and/or cycloaliphatically bonded isocyanate groups (calculated as NCO; molecular weight=42) from 0 to 10 wt. %,
      b) 2.0 to 25.0 wt. % content of urethane groups (calculated as NHCOO; molecular weight=59),
      c) 30 to 90 wt. % content of ethylene oxide units (calculated as $C_2H_4O$; molecular weight=44) bonded within polyether chains containing an average of 5 to 50 ethylene oxide units;
   (ii) hardening the mixture of step (i) to form the mineral building material, wherein the polyether-urethanes are prepared by reaction of (i) polyisocyanates which are based on aliphatic and/or cycloaliphatic diisocyanates, contain isocyanurate groups and have an isocyanate group content of 12 to 28 wt. % and a content of monomeric diisocyanates of less than 0.5 wt. % with (ii) polyether-alcohols having an average of 5 to 50 ethylene oxide units and optionally further compounds of the molecular weight range 32 to 300 which carry groups which are reactive with isocyanate groups are employed.

2. A method for making a mineral building material comprising the steps of:

(i) homogeneously mixing a water-dispersible or water-soluble polyether-urethane composition with an aggregate, a hydraulic inorganic binder, and water, the polyether-urethane composition comprising:
      a) an average isocyanate functionality of less than 1.8, a content of aliphatically and/or cycloaliphatically bonded isocyanate groups (calculated as NCO; molecular weight=42) from 0 to 10 wt. %,
      b) 2.0 to 25.0 wt. % content of urethane groups (calculated as NHCOO; molecular weight=59),
      c) 30 to 90 wt. % content of ethylene oxide units (calculated as $C_2H_4O$; molecular weight=44) bonded within polyether chains containing an average of 5 to 50 ethylene oxide units;
   (ii) hardening the mixture of step (i) to form the mineral building material;

wherein the polyether-urethanes are prepared by reaction of (i) a polyisocyanate that is based on 1,6-diisocyanatohexane, containing substantially isocyanurate groups and optionally uretdione groups and/or allophanate groups, having an isocyanate group content of 19 to 24 wt. % and a content of monomeric 1,6-diisocyanatohexane of less than 0.5 wt. % with (ii) polyethylene glycol monomethyl ethers containing an average of 5 to 25 ethylene oxide units and optionally compounds having a molecular weight range 32 to 300 which carry groups which are reactive with isocyanate groups are employed.

3. The building material formed by the method of claim 1.

4. The building material formed by the method of claim 2.

* * * * *